United States Patent
Locklair et al.

[11] 3,852,890
[45] Dec. 10, 1974

[54] REMOTE READING TILT ENCODER

[75] Inventors: Earl Everett Locklair, Greenville; Donald James Halsey, Garland, both of Tex.

[73] Assignee: E-Systems, Inc., Dallas, Tex.

[22] Filed: Mar. 2, 1972

[21] Appl. No.: 231,309

[52] U.S. Cl. .................................. 33/366, 33/395
[51] Int. Cl. ............................................. G01c 9/16
[58] Field of Search ............ 33/365, 366, 395, 1 N; 320/1; 328/129, 187, 189; 356/169, 170; 317/141 R, 142 R

[56] References Cited
UNITED STATES PATENTS

| | | | |
|---|---|---|---|
| 3,009,255 | 11/1961 | Robillard | 33/366 |
| 3,059,343 | 10/1962 | Kermode | 33/366 |
| 3,164,023 | 1/1965 | Holderer | 33/365 |
| 3,253,153 | 5/1966 | Stoddard | 356/169 |
| 3,452,175 | 6/1969 | Wilkes | 267/158 |
| 3,469,108 | 9/1969 | Elfers | 317/142 R |
| 3,490,153 | 1/1970 | Harris | 33/366 |
| 3,500,164 | 3/1970 | Burkhardt | 328/129 |

Primary Examiner—John W. Huckert
Assistant Examiner—Jon W. Henry
Attorney, Agent, or Firm—Richards, Harris & Medlock

[57] ABSTRACT

A pair of tilt encoders are mounted at right angles to one another. In one embodiment, each encoder comprises a pendulum connected to vary the resistance of a potentiometer as a function of the tilt angle of the pendulum. Each of the potentiometers are connected to a circuit which produces an output tilt resolution signal comprising an analog ramp function upon which is superimposed a single pulse. The time from the beginning of the ramp to the leading edge of the superimposed pulse is indicative of the tilt angle of one of the encoders while the time from the leading edge of the pulse to the end of the ramp is indicative of the tilt angle of the other encoder.

11 Claims, 10 Drawing Figures

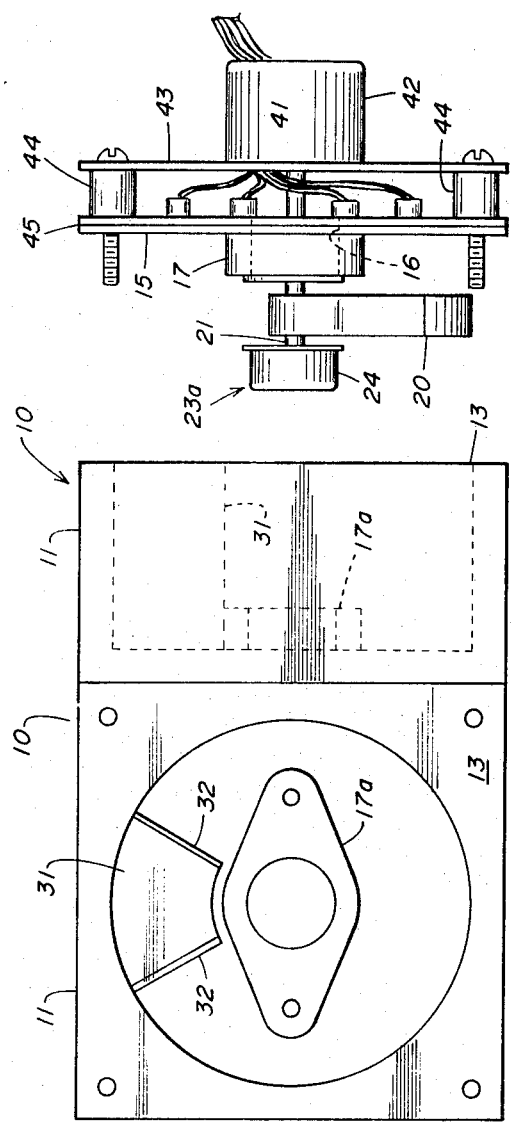
FIG. 1a
FIG. 1
FIG. 1b
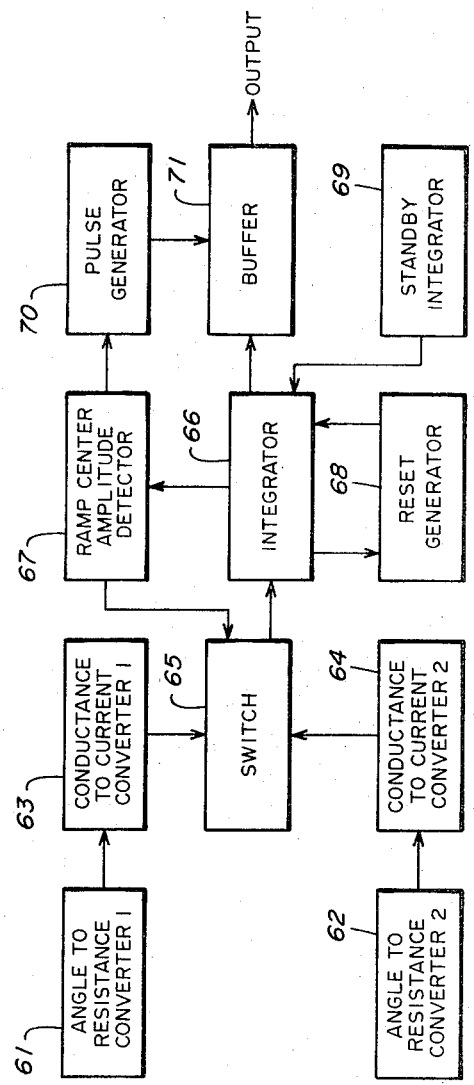
FIG. 3
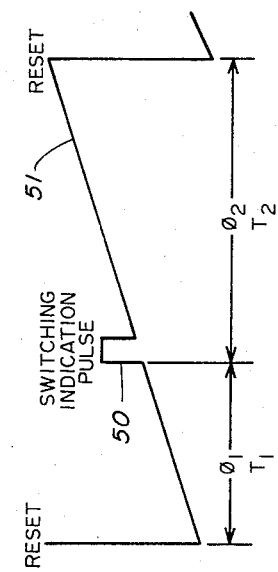
FIG. 2

3,852,890

REMOTE READING TILT ENCODER

BACKGROUND OF THE INVENTION

1. Field of the Invention

The invention relates to encoders for resolving the true angle of a structural plane to the gravity vector, and more particularly, to tilt encoders which produce a time code modulated output signal.

2. History of the Prior Art

Many prior art tilt encoding devices have employed tilt responsive voltage dividers. The voltage dividers are periodically sampled and the tilt indication is transmitted to a remote location as an amplitude modulated carrier wave. One disadvantage of amplitude modulation to transmit tilt information is that in order to transmit the orientation quadrant as well as the angle, it is necessary to have both positive and negative voltage outputs. For this type of encoder, the output signal is zero at zero degrees tilt angle. Should a failure occur, there is ambiguity as to whether a zero degree tilt indication is a result of an equipment failure or a true zero degree tilt orientation.

Other prior art devices have used frequency modulation to communicate a tilt indication. These systems also possess certain inherent disadvantages. For example, any drift in the system signal frequency can be erroneously interpreted as a variation in tilt angle of the encoders. Further, the technique of periodically transmitting calibration signals in order to account for the presence of frequency drift results in a considerably more complicated and expansive tilt encoding system.

The time code modulation technique employed in the present invention involves selectively placing a pulse in a waveform after a predetermined time from the beginning of the waveform to code information by means of the time interval selected. Time code modulation overcomes many of the disadvantages of both amplitude and frequency modulated remote reading tilt encoders.

SUMMARY OF THE INVENTION

In accordance with one mode of carrying out the invention, a tilt sensor includes a variable resistor the value of which is a function of the tilt orientation of the sensor. The sensor is connected to circuitry which produces a time code modulated output signal the period of which is proportional to the instantaneous value of the sensor resistance and, hence, the tilt angle thereof.

In accordance with a further aspect of the invention, a pair of tilt sensors include pendulum actuated potentiometers which are mounted at right angles to one another. The potentiometers produce two varying resistances which are functions of the tilt angles of the sensors in two perpendicular planes. A circuit repeatedly generates a ramp function and superimposes thereon a pulse in accordance with a time code modulation scheme. The time period from the beginning of the ramp to the leading edge of the pulse is proportional to the tilt angle of one of the sensors while the time period from the leading edge of the pulse to the end of the ramp is proportional to the tilt angle of the other sensor.

BRIEF DESCRIPTION OF THE DRAWING

For a more complete understanding of the present invention and for further objects and advantages thereof, reference may now be had to the following description taken in conjunction with the accompanying drawing in which:

FIGS. 1, 1A and 1B are views of two tilt sensors constructed in accordance with one embodiment of the invention;

FIG. 2 is a wave form illustrating the manner in which tilt information is time code modulated in accordance with the invention;

FIG. 3 is a block diagram of a tilt encoding system constructed in accordance with the invention;

DETAILED DESCRIPTION

Figure 4:
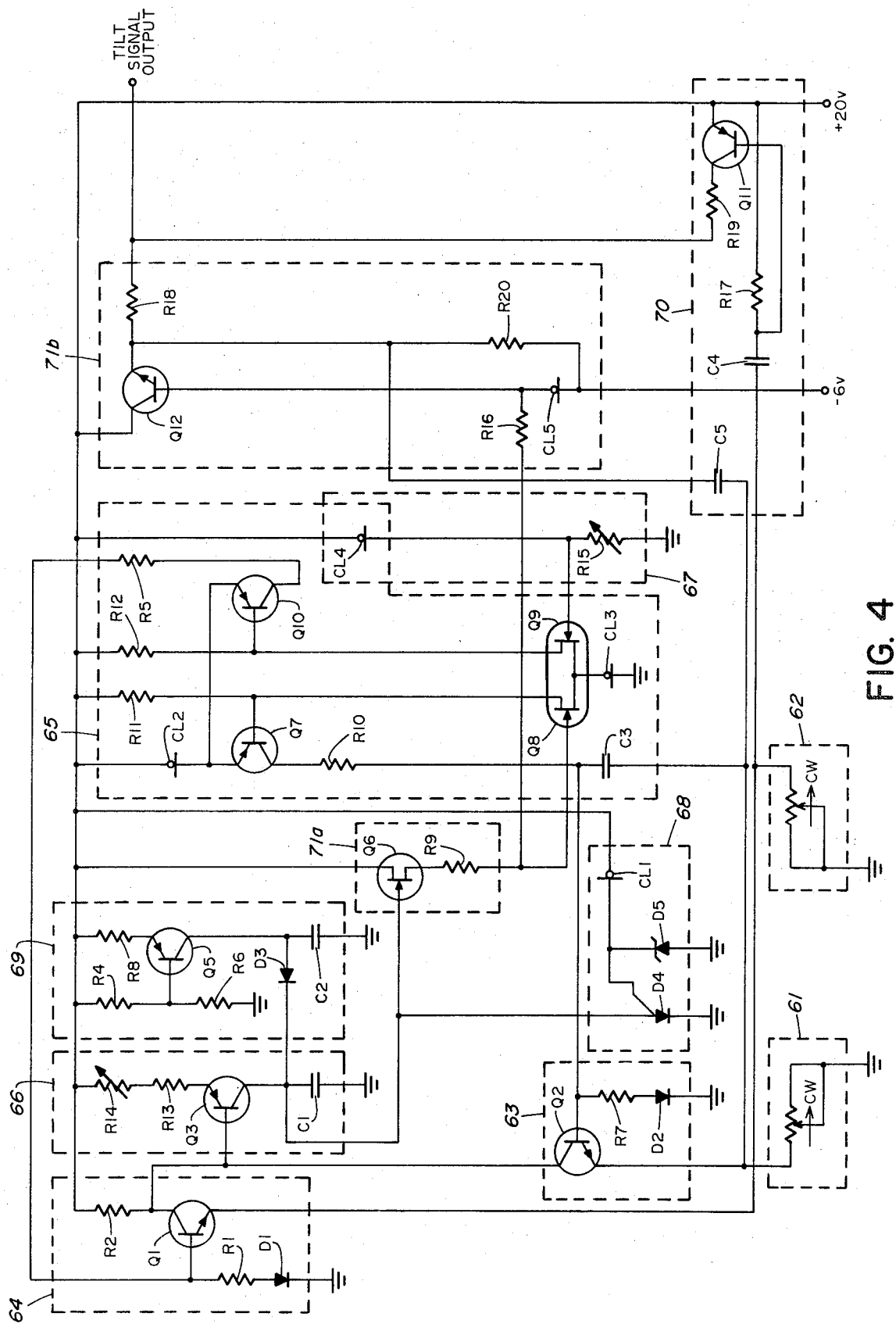
FIG. 4 is a schematic diagram of a circuit for time code modulating the tilt encoder outputs in accordance with the invention.

Referring to FIGS. 1, 1A and 1B, there is shown a pair of tilt encoding sensors which may be mounted upon a common structural plane within a vehicle, the spatial orientation of which is to be encoded, such as an airplane, ground based vehicle or platform, or a satellite operating within a gravitational field. The sensors comprise pendulum structures 10 and the housings of the encoders 12 and 13 which are mounted at right angles to one another. The encoders are shown in a partially exploded view, with the pendulum structures of both encoders removed, to show the internal construction of the devices. The pendulum mounting plate 15 of a first encoder 12 is shown removed and lying back parallel to the plane of the housing 11.

The pendulum mounting plate 15 of each encoder includes a central aperture 16 and has mounted thereto a bearing guide 17 having a central aperture coaxial with aperture 16. A triangular pendulum 20 is mounted to a shaft 21 which extends through an inner race 22 of a bearing 23. A bearing 23 is located on one side of the pendulum 20 and a bearing 23a is located on the opposite side. The outer race 24 of the bearing 23 is received within the central aperture of the bearing guide 17 and the outer race of the bearing 23a is received within a bearing guide 17a. The bearings 23 and 23a and also the potentiometers are preferably of a low friction type to assure repeatability of the rest position of the pendulum. If necessary, the pendulum movement may be damped with a viscous fluid or magnetic damper. Each housing for the encoders 12 and 13 includes at the top portion thereof a snubber wedge 31 having shock absorbing resilient layers 32 (shown only for encoder 12) affixed to each side. The snubber 31 limits pendulum movement to an arc on the order of 270°, in the present embodiment. Larger angular movement can be provided as required.

Referring to FIG. 1A, for the encoder 13, the shaft 21 of the pendulum 20 is fixed to the shaft 41 of a potentiometer 42 so that any movement of the pendulum is reflected in a change in position of the potentiometer wiper arm. The potentiometer 42 is mounted to a cover plate 43 which is in turn fixed to a printed circuit board 45 and the mounting plate 15 by means of stand-off insulators 44. The printed circuit board 45 mounts and interconnects the electrical components constituting the circuitry associated with the tilt encoder of the present invention.

The encoder 12 includes a similar arrangement of potentiometer and printed circuit board A high degree of angular accuracy may be achieved with the tilt encoder of the present invention. The structure of the encoder is inherently rugged and can be adapted to resist extreme environments often encountered in rough terrain and in high altitude vehicles.

The present tilt encoder system resolves tilt information so that there is no ambiguity as to the reference plane or quadrant. To accomplish this function, time code modulation is used in which the variable potentiometer resistances are converted, by the circuitry of the invention, into time intervals. A reference, zero time is established to correspond to a completely upside-down situation.

The output of the circuitry of the invention is illustrated by the wave form of FIG. 2 which is an integrated linear trace proportional to tilt angle. In the preferred embodiment, one unit of time corresponds to one degree of tilt. The tilt angle $\phi_1$ of the first encoder, in degrees, is equal to the period $T_1$ in milliseconds, from the reference point to the beginning of a pulse 50 superimposed upon a ramp function 51. The tilt angle $\phi_2$ of the second encoder, in degrees, is equal to the period $T_2$, in milliseconds, from the beginning of the superimposed pulse 50 to the end of the ramp function 51.

The output tilt signal of the circuitry of the present invention can be further processed in several different manners. For example, the two angles represented by time periods $T_1$ and $T_2$ may be resolved electronically into two different angles, one angle indicating the tilt of the plane of the structure with respect to earth normal and the other angle indicating which corner of the structural plane is up. Another technique of utilizing the tilt output data is that of providing nomographs for manually resolving orientation angles at a remotely located receiving point. It should also be understood that the tilt angle, differentiated with respect to time, can indicate angular velocity and angular acceleration.

The resistances of the pendulum-actuated potentiometers are converted to the time code modulated output signal of FIG. 2 by the circuitry shown in block diagram in FIG. 3. A pair of angle to resistance converter tilt sensors 61 and 62, such as the pendulum-actuated potentiometers of FIGS. 1, 1A and 1B, are connected, respectively, to current converters 63 and 64 which produce current values inversely proportional to the resistance values. The current values produced by the two converters 63 and 64 are periodically sampled by a switch 65 having its output connected to an integrator 66. The output of the integrator 66 is connected to a ramp center amplitude detector 67 which includes a threshold detector referenced against the expected center of the ramp output voltages. A reset generator 68 produces a voltage when the ramp potential reaches a predetermined value to reset the integrator 66. A standby integrator 68 is used to generate a very slow ramp function which is ORed to the output of the main integrator 66 and introduced in the event one of the tilt sensors fails. The ramp center amplitude detector 67 is connected to a pulse generator 70. The tilt indicating signal is connected as an output through a buffer 71. The time code modulated output signal may either be utilized directly and the information processed on board the vehicle carrying the system, or the signal may be transmitted to a remote location.

The system shown in the block diagram of FIG. 3 may be implemented by the circuit shown schematically in FIG. 4. The first tilt sensor 61 is connected to the current converter 63 which comprises a transistor $Q_2$ having its base connected to a circuit including a resistor $R_7$ and a diode $D_2$. The second tilt sensor 62 is similarly connected to the current converter 64 comprising a transistor $Q_1$ with the base electrode connected to ground through a resistor $R_1$ and a diode $D_1$. The transistors $Q_1$ and $Q_2$ are connected through a common collector resistor $R_2$ to a positive 20 volt bus and are coupled to the switch 65 by means of their base electrodes which are connected, respectively, to the collector leads of a pair of transistors $Q_{10}$ and $Q_7$ through resistors $R_5$ and $R_{10}$.

The switch 65 includes the transistors $Q_7$ and $Q_{10}$ having their base leads connected, respectively, to the field-effect transistors $Q_8$ and $Q_9$. The base electrodes of the transistors $Q_7$ and $Q_{10}$ are biased by connection to the positive 20 volt bus through resistors $R_{11}$ and $R_{12}$ while the emitters are biased by connection to the same point through a constant current device $CL_2$. The gate of transistor $Q_9$ is connected between a constant current device $CL_4$ and a potentiometer $R_{15}$ comprising the ramp center amplitude detector 67.

The switch 65 alternately connects the two converters 63 and 64 to the integrator 66 comprising an integrating capacitor $C_1$ coupled to the collector of a transistor $Q_3$. The emitter of the transistor $Q_3$ is connected to the positive 20 volt bus through a resistor $R_{13}$ and a potentiometer $R_{14}$.

The standby integrator 69 comprises a charging capacitor $C_2$, a transistor $Q_5$, an emitter resistor $R_8$, a network of base biasing resistors $R_4$ and $R_6$, and a coupling diode $D_3$.

The integrators 66 and 69 are connected to the reset generator 68 through a programmable unijunction transistor $D_4$. The gate lead of $D_4$ is connected to the positive 20 volt source through a constant current diode $CL_1$ and to ground through a zener diode $D_5$.

The integrators 66 and 69 are coupled to the output by means of a buffer comprising units 71a and 71b. The buffer unit 71a includes a field effect transistor $Q_6$ and a drain resistor $R_9$ while the buffer unit 71b comprises a transistor $Q_{12}$, a resistor $R_{16}$, a constant current diode $CL_5$, a bias resistor $R_{20}$ connected to a negative 6 volt source and an output resistor $R_{18}$.

The output signal is fed back by means of the pulse generator 70 which includes a resistor $R_{19}$, a transistor $Q_{11}$, a resistor $R_{17}$ and a pair of coupling capacitors $C_4$ and $C_5$.

As discussed above, the resistance variations produced by the tilt sensors 61 and 62 are alternately connected to the converters 63 and 64 by the switch 65. When transistor $Q_{10}$ is conducting, the base of $Q_1$ is forward biased by current flowing through $Q_{10}$ and the resultant voltage developed across the resistor $R_1$ and the diode $D_1$. The constant current diode $CL_4$ and the potentiometer $R_{15}$ set the level of the center of the ramp to be generated so that a signal is produced whenever the voltage exceeds the center value.

The diode $D_3$ acts as a commutating diode which switches between the two integrating capacitors $C_1$ and $C_2$. The first integrator 66 is used exclusively as long as both of the tilt sensors 61 and 62 are operating properly. The primary purpose of the second integrator 69 is to provide redundancy and produce an indication in the event one of the sensors fails. If the sensor connected through the switch 65 malfunctions and does not produce an output, the capacitor $C_1$ is not charged. The second capacitor $C_2$, however, continues to charge at a slower rate than first capacitor $C_1$ normally charges, until the voltage across $C_2$ exceeds the conduction voltage of the commutating diode $D_3$. The voltage on capacitor $C_2$ is then connected to the reset generator 68 and the buffer unit 71a. The slower integration by capacitor $C_2$ produces a time delay which is indicative of a malfunction of one of the sensors.

The reset generator 68 is comprised of $D_4$, $D_5$ and $CL_1$. The constant current diode $CL_1$ holds the current flow to a constant value while the zener diode $D_5$ maintains a constant voltage at the gate of $D_4$. When the voltage on either of the capacitors $C_1$ or $C_2$ exceeds a preselected value, $D_4$ is triggered into conduction to discharge both of the capacitors $C_1$ and $C_2$. The programmable unijunction transistor $D_4$ is characterized by a very high anode-cathode impedence until the anode potential rises aproximately 0.7 volts above that of the gate and then conduction begins rapidly at a very low impedance.

In one embodiment of the invention the following actual components were used for those shown in FIG. 4:

| | |
|---|---|
| $Q_1$, $Q_2$ and $Q_{12}$ | 2N3391 transistor |
| $Q_3$, $Q_5$, $Q_7$, $Q_{10}$ and $Q_{11}$ | 2N2907 transistor |
| $Q_6$ | 2N4416 field effect transistor |
| $Q_8$ and $Q_9$ | 2N5452 dual field effect transistor |
| $D_1$ and $D_2$ | 1N914 diode |
| $D_3$ | 1N3595 diode |
| $D_4$ | D13T2 programmable unijunction transistor manufactured by the General Electric Co. |
| $D_5$ | 1N757 zener diode |
| $CL_1$ | CL2220 current limiter diode |
| $CL_2$ | CL1120 current limiter diode |
| $CL_3$, $CL_4$ and $CL_5$ | CL4710 current limiter diode |
| $C_1$ | 1.22 microfarad capacitor |
| $C_2$ | 2.5 microfarad capacitor |
| $C_3$ | 0.001 microfarad capacitor |
| $C_4$ | 0.1 microfarad capacitor |
| $C_5$ | 0.015 microfarad capacitor |
| $R_1$ and $R_7$ | 3.3K ohm |
| $R_2$ | 680 ohm |
| $R_4$, $R_{11}$, $R_{12}$, $R_{15}$, $R_{17}$ | 10K ohm |
| $R_5$ and $R_{10}$ | 1K ohm |
| $R_6$ | 24K ohm |
| $R_8$ | 200K ohm |
| $R_9$ | |
| $R_{13}$ and $R_{14}$ | 100K ohm |
| $R_{16}$ | 7.5K ohm |
| $R_{18}$ and $R_{20}$ | 4.7K ohm |
| $R_{19}$ | 15K ohm |

Referring again to FIG 4, when power is applied to the circuit, the integrating capacitors $C_1$ and $C_2$ are completely discharged through the programmable unijunction transistor $D_4$. The switching transistors $Q_7$ and $Q_8$ are all in nonconductive states. Since the diodes $CL_2$ and $CL_3$ must carry a constant current, the switching transistors $Q_9$ and $Q_{10}$ are in conductive states. The series connected constant current diode $CL_4$ and the potentiometer $R_{15}$ establish a voltage value which biases $Q_9$ and $Q_{10}$ into conduction to satisfy the current requirements of $CL_2$ and $CL_3$. The current through $Q_{10}$ also flows through the diode $D_1$ and the resistor $R_1$ to bias the transistor $Q_1$ into a conductive state. Thus, the switch 65 enables the second converter 64 to charge the integrator 66.

The tilt sensor 62 is connected to the emitter of transistor $Q_1$. When $Q_1$ is conductive, the voltage drop across the sensor 62 plus the base-emitter drop of approximately 0.7 volts is equal to the voltage across the base of the transistor $Q_1$. The voltage across the sensor 62 is essentially equal to the voltage across the resistor $R_1$, since the diode $D_1$ simulates the base-emitter drop of transistor $Q_1$. The voltage on the collector of $Q_1$ is applied to the base of the integrating transistor $Q_3$. As the capacitor $C_1$ charges, its charging voltage is applied through the buffer transistor $Q_6$ to the gate of transistor $Q_8$. The capacitor $C_1$ continues to charge until the voltage on the gate of $Q_8$ exceeds the preselected center reference voltage applied to the gate of $Q_9$ via diode $CL_4$ and resistor $R_{15}$. As $Q_8$ begins to conduct, the current is amplified through transistor $Q_7$ and applied to the base of $Q_2$. When $Q_2$ begins to conduct, part of the current is fed back through the capacitor $C_3$ to make the switching transition proceed more rapidly and turn transistors $Q_7$ and $Q_8$ off.

As the capacitor $C_1$ is charging, the voltage thereon is coupled through the buffer transistor $Q_6$, resistor $R_9$, resistor $R_{16}$, the transistor $Q_{12}$ and through resistor $R_{18}$ as an output ramp signal. As the transition from conduction of transistors $Q_9$ and $Q_{10}$ to conduction of transistors $Q_8$ and $Q_7$ occurs, the current through the transistor $Q_1$, connected to the second tilt sensor 62, begins to decrease. This decrease in current flow through the tilt sensor 62 is coupled through capacitor $C_4$ to the base of transistor $Q_{11}$ to produce a leading edge of a square wave pulse which is superimposed upon the ramp signal output. Thus, the time from the beginning of the ramp until the leading edge of the square wave pulse is indicative of the tilt angle of the sensor 62. The component values are preferably selected so that the time in milliseconds is equal to the tilt angle in degrees.

Once transistor $Q_{11}$ is conducting, current is coupled through resistors $R_{19}$ and $R_{18}$, capacitor $C_5$, and capacitor $C_3$ to the base of transistor $Q_2$. The current through capacitor $C_3$ causes transistor $Q_2$ to go into full conduction more rapidly and transistor $Q_1$ to be turned off more rapidly. When $Q_1$ has ceased conduction, the base of transistor $Q_{11}$ is no longer forward biased and $Q_{11}$ stops conducting. This transition of transistor $Q_{11}$ from a conductive state to a nonconductive state generates the trailing edge of the rectangular output pulse.

Capacitor $C_1$ charges until its voltage reaches the preselected maximum voltage level set by the constant current diode $CL_1$ and the zener diode $D_5$. When this value is reached, the unijunction transistor $D_4$ goes into conduction and rapidly discharges both the capacitors $C_1$ and $C_2$, thereby terminating the ramp. As pointed out above, the time between the beginning of the ramp function and the leading edge of the superimposed rectangular pulse is a measure of the tilt angle of the second sensor 62. The resistance value of the sensor determines the current flow to the charging capacitor $C_1$ and, hence, its rate of charge.

Referring again to FIG. 4, as soon as the switching action of the switch 65 occurs, the transistor $Q_7$ conducts and the base of $Q_2$ is forward biased. The voltage developed across the tilt sensor 61 must be essentially equal to that developed across the resistor $R_7$ because the drop across the diode $D_2$ is approximately equal to 0.7 volts, the base emitter drop of the transistor $Q_2$. The voltage across the first sensor 61 is coupled through the transistor $Q_2$, the transistor $Q_3$ and continues to charge the capacitor $C_1$, but at a perhaps different rate from the rate at which it was charged by the second sensor 62 via the transistor $Q_1$. The capacitor $C_1$ charges at a rate which is proportional to the tilt angle of the selected sensor.

Capacitor $C_1$ continues to charge until its voltage reaches a preselected value set by the zener diode $D_5$ at which time the unijunction transistor $D_4$ begins to conduct thereby discharging the capacitors and ending the ramp. The time from the beginning of the ramp to the leading edge of the superimposed rectangular pulse is equal to the tilt angle of one sensor, while the time from the beginning of the leading edge of the rectangular pulse to the end of the ramp is indicative of the tilt angle of the other sensor.

In the event that one of the tilt sensors fails to function properly, the standby integrator 69 is used. Assuming that the first sensor has failed, for example due to an open circuit, the capacitor $C_1$ will not be charged, but the circuit comprised of transistor $Q_5$, the resistor $R_8$, resistor $R_4$, and resistor $R_6$ charges the capacitor $C_2$. The voltage across $C_2$ is not coupled out of the circuit until its value exceeds the sum of the voltage across capacitor $C_1$ and the drop across the commutating diode $D_3$. Capacitor $C_2$ charges at a slower rate than capacitor $C_1$. When the voltage value on the charging capacitor $C_2$ exceeds that of $C_1$ so that a voltage is coupled out into the buffer transistor $Q_6$, the time required will be greater than 360 milliseconds. Since, in the preferred embodiment 1 millisecond is equal to 1 degree of tilt, it will be apparent that one of the sensors has failed. The stored voltage on standby capacitor $C_2$ actuates the switch 65, just as the voltage on capacitor $C_1$ does, to energize the other non-malfunctioning sensor and an accurate tilt reading is obtained from that sensor.

The time from the leading edge of the superimposed square wave pulse to the end of the ramp remains indicative of the tilt angle of the second sensor even though the first sensor has failed. The only difference from normal operation is that the time from the beginning of the ramp until the leading edge of the pulse will be much longer than would normally be the case. If the first sensor 62 fails, then the only accurate time available is that from the occurrence of the pulse to the end of the ramp which will be indicative of the tilt angle of the second sensor 61. In the event the second sensor 61 fails, the only accurate indication will be the time from the beginning of the ramp to the leading edge of the pulse with the trailing portion being much longer than normal.

Figure 5:
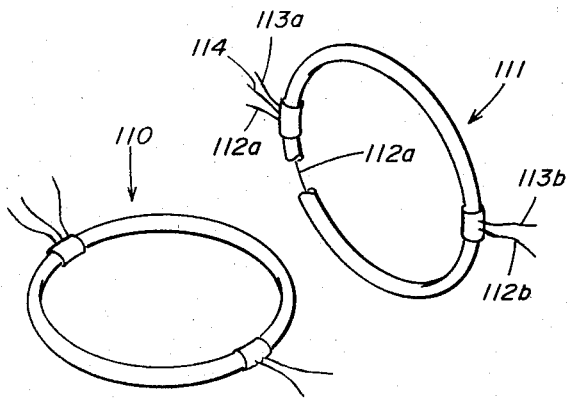
FIG. 5 is a perspective view of an alternate embodiment of tilt sensors used in the invention comprising mercury filled toroidal tubes.

Referring now to FIG. 5, there is schematically illustrated an alternate embodiment of tilt sensors which may be used in conjunction with the circuitry of the invention to produce a time code modulated output signal. The sensors comprise a pair of hollow toroids 110 and 111 mounted with their axes perpendicular to one another. Each of the toroids 110 and 111 includes an axial conductor comprising material resistant to chemical attack or amalgamation such as molybdenum. Each of the toroids are one half filled with a conductive fluid such as an electrolyte or mercury. Referring to the toroid 111, it can be seen that a first wire 112a enters through one side of the toroid, passes along a semicircular path following the axis of the toroid and then exits as a wire 112b. Similarly, a second wire 113a also enters the toroid, passes in a semicircular path along its axis and then exits as a wire 113b. A third wire 114 is terminated just inside the walls of the toroid 111 to sense whether or not the sensor is upside down.

As can be seen from FIG. 5, the conductive fluid moves around the tube due to changes in orientation of the sensor. As the fluid moves, the effective length of the axially extending conductors 112 and 113 is varied to change the resistance. The conductors are connected so that the tilt dependent, variable resistances thereof are coupled as inputs to the circuitry of FIG. 4.

Figure 6:
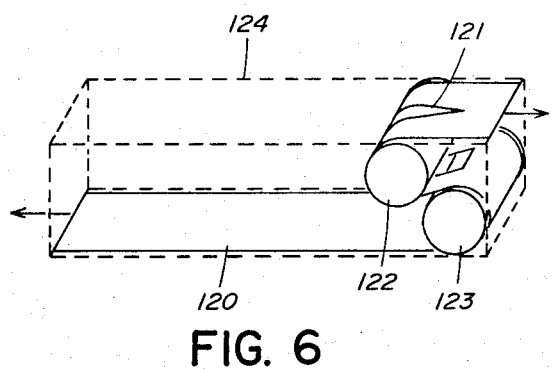
FIG. 6 is a perspective view of an alternate embodiment of a tilt sensor used in the invention comprising a band and roller device.

FIG. 6 illustrates schematically a further alternate embodiment of a sensor to be used in connection with the invention. The sensor of FIG. 6 employs the principle of the Rolamite device described in U.S. Pat. No. 3,452,175, together with a suitable resistance pickoff contact. The device of FIG. 6 includes a Rolamite band 120 comprising a conductive spring-like material formed around a pair of conductive rollers 122 and 123. The band 120 is selectively weakened in a triangular pattern at 121 and the device is mounted within a rectangular container 124. Gravity acts on the two rollers 122 and 123 and causes the rollers to move relative to the container 124 and assume a position depending on the angle of tilt of the container. The triangular pattern 121 is employed to insure that the movement of the rollers 122 and 123 is linearly proportional to tilt angle. One electrical contact is made at one end of the band 120 and another at one of the rollers so that as the rollers move down the band, the resistance of the length of band between the two contacts varies in proportion to the angle of tilt. The varying resistance is connected to be processed into a tilt angle signal by the circuitry of FIG. 4.

Figure 7:
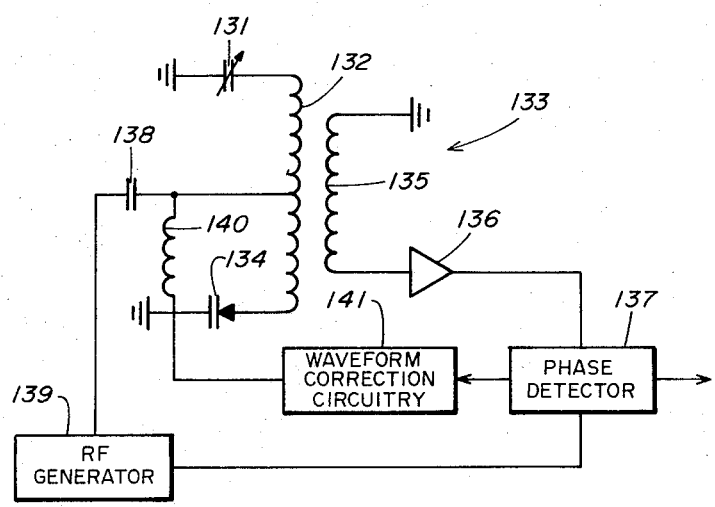

Techniques other than variations in resistance may be used in a sensor to determine the angle of tilt. For example, means can be provided to cause a variation in width of a capacitive gap which is proportional to the angle of tilt of the sensor. Referring to FIG. 7, there is shown a circuit for producing a variable output signal as a function of the gap between a moving element and a stationary reference. A variable capacitor 131, which represents the capacitance between two relatively moving elements, is connected in series with a first winding 132 of a transformer 133 and a voltage variable capacitor 134. A secondary winding 135 of the transformer 133 is connected to an amplifier 136, the output of which is coupled to one input of a phase detector 137. A center tap of the winding 132 is connected through a capacitor 138 to the output of an RF generator 139. The generator output is also connected to another input of the phase detector 137. The center taps of the winding 132 are connected through a radio frequency choke 140 to the output of wave form correction circuitry 141 which is fed by the output of the phase sensitive detector 137. Thus, as a moving element of a sensor responds to tilt angle, a change in the value of the capacitance 131 will produce a modulated output signal via the phase detector 137. This output signal is then processed into the form of tilt indicative signal desired.

Figure 8:
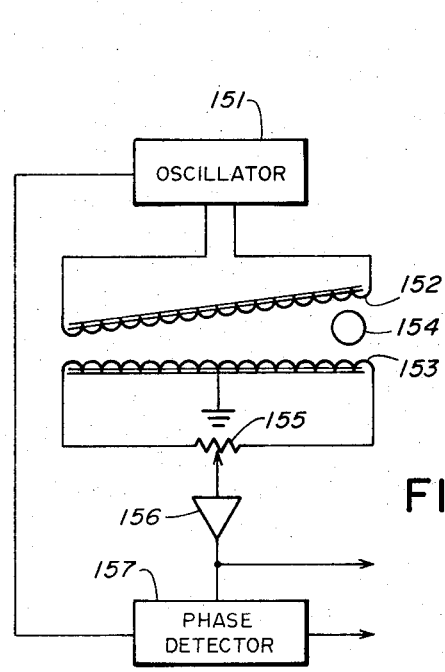
FIGS. 7 and 8 are schematic diagrams of alternate embodiments of tilt angle sensing circuits used in the system of the invention.

Referring now to FIG. 8, there is shown a further alternative embodiment of an angle pickup sensor which incorporates a magnetic or variable reluctance coupling for use with a moving magnetic element, such as the rollers of the Rolamite device of FIG. 6. Referring to FIG. 8, an oscillator 151 is connected to a first coil 152 which is spaced from a second coil 153. A moving magnetic element 154 is positioned therebetween. A center tap of the second coil 153 is grounded while the coil is connected across a potentiometer 155. The voltage selected by the potentiometer 155 is connected to an amplifier 156. The output of the amplifier is connected to a phase detector 157 which is also connected to the output of the oscillator 151. Thus, movement of the element 154 on a path between the two coils 151 and 152 changes the reluctance therebetween and produces a variable output signal which is a function of the position of moving element 154.

It can be seen that structure and circuitry of the invention provide a highly efficient and flexible means of determining the tilt angle of a body. Further, the system of the invention provides a remotely readable tilt output signal which is not subject to the transmission difficulties of prior amplitude modulated and frequency modulated output signals.

Having described the invention in connection with certain specific embodiments thereof, it is to be understood that further modifications may now suggest themselves to those skilled in the art and it is intended to cover such modifications as fall within the scope of the appended claims.

What is claimed is:

1. A tilt sensing system comprising:
first means for producing a position signal varying in magnitude with the position of a body with respect to a gravity vector through a pivot thereof;
second means connected to said first means for generating a ramp signal, the magnitude of said ramp signal starting at a reference level and having a linear increase with time related to the position signal;

third means connected to said second means for generating a pulse signal to be superimposed upon said ramp signal at a pre-established magnitude thereof whereby the time elapsed for the ramp signal to increase from the reference level to the pre-established magnitude is proportional to the value of said position signal; and
circuit means responsive to said third means to superimpose the pulse signal on said ramp signal.

2. A tilt sensing system as set forth in claim 1 wherein said first means includes:
a hollow toroid formed of insulating material;
a wire extending axially around the interior of said toroid; and
a conductive fluid occupying a fraction of the interior volume of said toroid to vary the resistance of said wire as a function of the orientation of said toroid.

3. A tilt sensing system as set forth in claim 1 wherein said first means includes a band and roller device.

4. A tilt sensing system as set forth in claim 1 wherein said first means includes:
a pendulum rotatable about an axis normal to the gravity vector; and
a potentiometer having a wiper arm coupled to said pendulum and positioned in accordance with the movement thereof.

5. A tilt sensing system as set forth in claim 1 wherein said second means includes:
means for generating a current proportional to said position signal; and
means for integrating said current to generate the ramp signal.

6. A tilt sensing system as set forth in claim 5 wherein said third means includes:
comparing means for continuously comparing the magnitude of said ramp signal with the magnitude of a preselected reference signal; and
means connected to said comparing means and actuated when the magnitude of said ramp signal equals the magnitude of the preselected reference signal for generating the pulse signal to be superimposed onto said ramp signal.

7. A tilt sensing system comprising:
first means for producing a position signal varying in magnitude with the position of a pendulum weight with respect to the gravity vector through a pivot point thereof;
second means connected to said first means for generating a ramp signal, the magnitude of said ramp signal starting at a reference level and having a linear increase with time related to the position signal;

third means connected to said second means for generating a pulse signal to be superimposed upon said ramp signal at a pre-established magnitude thereof whereby the time elapsed for the ramp signal to increase from the reference level to the pre-established magnitude is proportional to the value of said position signal; and
circuit means responsive to said third means to superimpose the pulse signal on said ramp signal.

8. A tilt sensing system comprising:
first means for producing a first position signal varying in magnitude with the position of a body in a first plane with respect to the gravity vector through a pivot point thereof;
second means for producing a second position signal varying in magnitude with the position of a body in a second plane with respect to the gravity vector through a pivot point thereof, said first and second planes being orthogonal;
third means connected to said first and second means for generating a ramp signal, the magnitude of the ramp signal starting at a reference level and having a linear increase with time related to the first position signal for a first period and having a linear increase with time related to the second position signal for a second period;
fourth means connected to said third means for generating a pulse signal to be superimposed upon said ramp signal at a pre-established magnitude thereof whereby the time elapsed for the ramp signal to increase from the reference level to the pre-established magnitude is proportional to the value of said first position signal;

circuit means responsive to said fourth means to superimpose the pulse signal on said ramp signal; and fifth means connected to said third means for terminating said ramp signal at a second pre-established magnitude thereof whereby the time elapsed for the ramp signal to increase from the superimposed pulse signal to the second pre-established magnitude is proportional to the magnitude of said second position signal.

9. A tilt sensing system as set forth in claim 8 wherein said first means includes a first pendulum rotatable about an axis normal to the gravity vector;
- a first potentiometer having a wiper arm coupled to said first pendulum and positioned in accordance with the movement thereof;
- a second pendulum rotatable about an axis normal to the axis of said first pendulum and to the gravity vector; and
- a second potentiometer having a wiper arm coupled to said second pendulum and positioned in accordance with the movement thereof.

10. A tilt sensing system as set forth in claim 8 wherein said third means includes:
- first means for generating a first current proportional to the magnitude of said first position signal;
- second means for generating a second current proportional to the magnitude of said second position signal;
- means for integrating one of said currents to generate a ramp signal;
- switching means for alternately connecting said first and second current generating means to said integrating means;
- means operable when said first current generating means is connected to said integrating means for continuously comparing the magnitude of said ramp signal with the magnitude of a preselected center reference signal;
- means responsive to when the magnitude of said ramp signal equals the magnitude of said center reference signal for generating the pulse signal to be superimposed onto said ramp signal;
- means actuating said switching means to connect said second current generating means to said means for integrating;
- means operable when the second current generating means is connected to said means for integrating for continuously comparing the magnitude of said ramp signal with the magnitude of a preselected maximum signal;
- means responsive to when the magnitude of said ramp signal equals the magnitude of said center reference signal for interrupting said means for integrating to terminate said ramp signal at a time from the generation of said superimposed pulse proportional to the position of said body in said second plane; and
- means for actuating said switching means to connect said first current generating means to said integrating means.

11. A tilt sensing system as set forth in claim 10 which also includes:
- switching means connected to the output of said means for integrating;
- second means for integrating to generate a second ramp signal having a magnitude increasing at a slower rate than said first means for integrating connected to said switching means; and
- means responsive to the magnitude of the ramp signal of said second means for integrating and when the magnitude thereof exceeds the magnitude of the ramp signal of said first means for integrating by a preselected value for actuating said switching means to connect said second means for integrating and said first means for integrating in parallel.

* * * * *